Feb. 7, 1967 T. C. COLACURCIO 3,302,308
DEVICE FOR TEACHING TRIGONOMETRIC FUNCTIONS
Filed Jan. 25, 1965 3 Sheets-Sheet 1
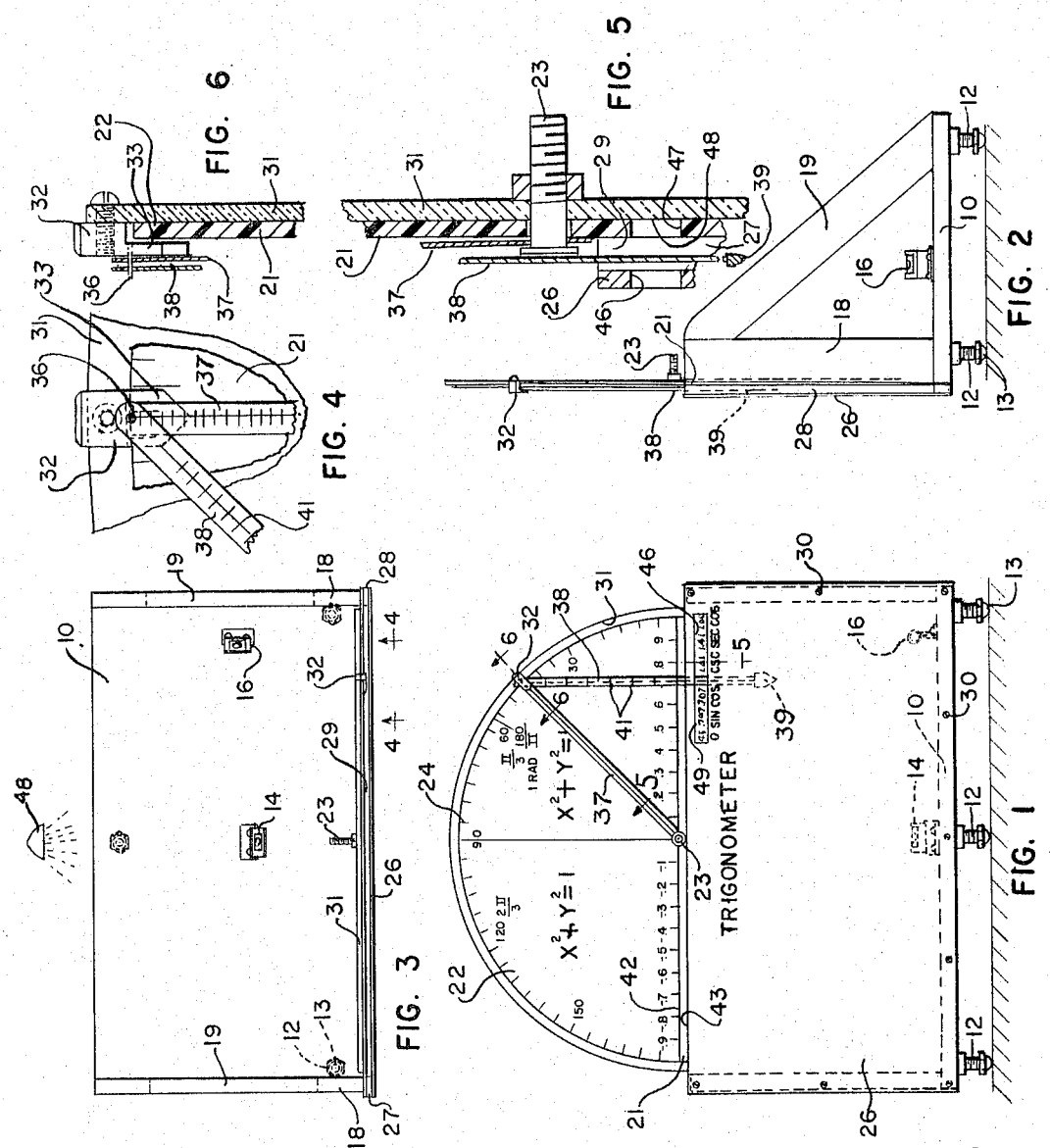
INVENTOR.
THOMAS C. COLACURCIO
BY Pearce and Schaeperklaus
Attorneys.

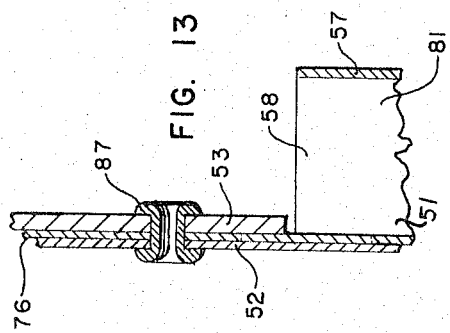
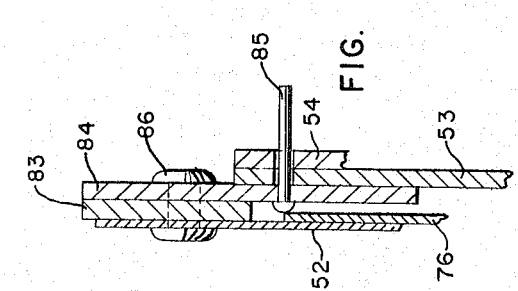
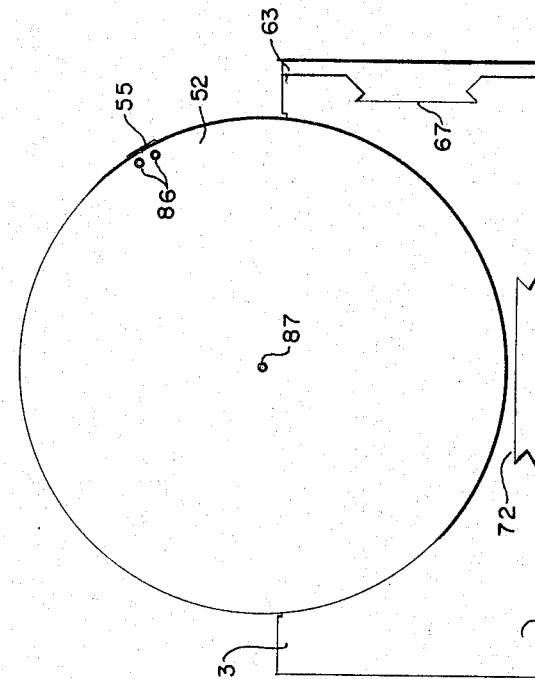
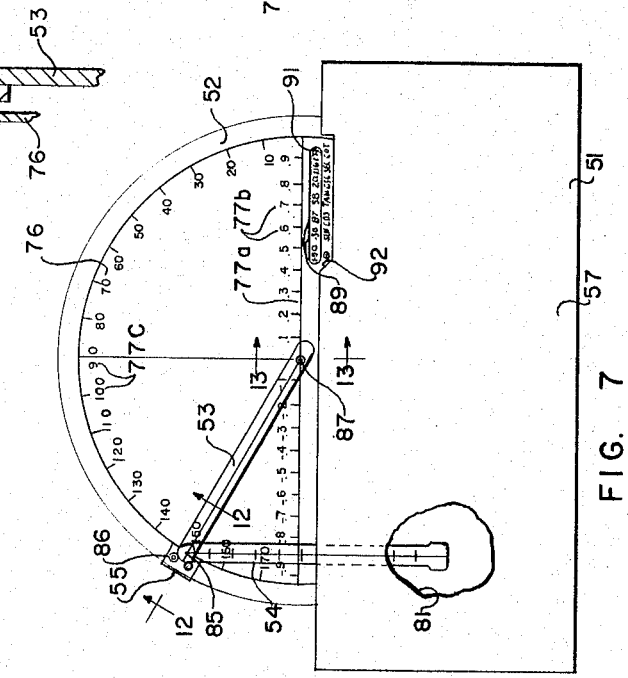

Feb. 7, 1967     T. C. COLACURCIO     3,302,308

DEVICE FOR TEACHING TRIGONOMETRIC FUNCTIONS

Filed Jan. 25, 1965     3 Sheets-Sheet 3

INVENTOR.
THOMAS C. COLACURCIO
BY Pearce & Schaeperklaus
Attorneys

United States Patent Office 3,302,308
Patented Feb. 7, 1967

3,302,308
DEVICE FOR TEACHING TRIGONOMETRIC
FUNCTIONS
Thomas C. Colacurcio, 6609 Beechmont Ave.,
Cincinnati, Ohio 45230
Filed Jan. 25, 1965, Ser. No. 427,734
7 Claims. (Cl. 35—34)

This invention relates to teaching devices. More particularly this invention relates to teaching aids which demonstrate trigonometric functions.

An object of this invention is to provide a teaching aid on which values of trigonometric functions are indicated visually.

A further object of this invention is to provide a teaching aid of this type in which trigonometric functions are indicated visually and in which values of the functions are concurrently shown through a window therein.

A further object of this invention is to provide a teaching aid of this type in which a wheel carrying an angle indicating device can be swung to various angles and in which a pendulum-scale hanging from the indicating device visually indicates the trigonometric functions.

A further object of this invention is to provide a device of this type in which the pendulum-scale or pendulum has a portion which is visible to indicate a value of the sin function and in which other portions of the pendulum are hidden so that the visible portion of the pendulum indicates the sin function.

A further object of this invention is to provide a teaching aid of this type in which an enclosed open topped box is provided for receiving the hidden portion of the pendulum.

A further object of this invention is to provide a teaching aid of this type in which, during initial teaching stages, sin functions can be visually seen on a pendulum having a portion received in a box which covers a portion of a dial on which angular values can be read and in which, at later stages in teaching, the box can be removed so that the wheel and dial provide a calculator on which trigonometric functions are shown.

The above and other objects and features of the invention will be apparent to those skilled in the art to which this invention pertains from the following detailed description and the drawings in which:

FIG. 1 is a view in front elevation showing a teaching aid constructed in accordance with an embodiment of this invention;

FIG. 2 is a view in side elevation of the teaching aid shown in FIG. 1;

FIG. 3 is a top plan view of the teaching aid shown in FIGS. 1 and 2;

FIG. 4 is an enlarged fragmentary view looking in the direction of the arrows 4—4 in FIG. 3 with a wheel portion of the teaching aid displaced;

FIG. 5 is an enlarged view in section taken on the line 5—5 in FIG. 1;

FIG. 6 is an enlarged view in section taken on the line 6—6 in FIG. 1;

FIG. 7 is a view in front elevation of a device embodying another embodiment of this invention a portion of one panel thereof being broken away to reveal details of construction;

FIG. 8 is a view in rear elevation of the device shown in FIG. 7;

FIG. 12 is an enlarged view in section taken on the line 12—12 in FIG. 7.

FIG. 13 is an enlarged view in section taken on the line 13—13 in FIG. 7.

In the following detailed description and the drawings, like reference characters indicate like parts.

Figure 10:
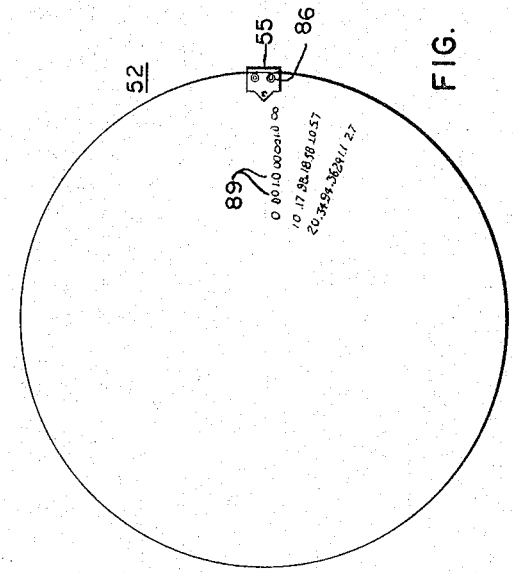
FIG. 10 is a plan view of a wheel forming a portion of the device illustrated in FIGS. 7 and 8, a pointer member being shown attached thereto; parts of indicia thereon being omitted.

In FIGS. 1 to 3 inclusive is shown a teaching aid constructed in accordance with an embodiment of this invention. The device includes a base 10 mounted on adjustable legs 12. Feet 13 are threaded to the legs 12 and can be turned to adjust the level of base 10 and other portions of the teaching aid. Spirit levels 14 and 16 are mounted on the base 10 for use in leveling the teaching aid. Frame members 18 and 19 are mounted on and extend upwardly from the base and support a main panel 21 having an upwardly extending semi-circular portion 22 (see FIG. 1) on which angular displacement about a center pivot bolt 23 is indicated by graduations 24. A front panel 26 is spaced from the main panel 21 by spacer members 27 and 28 mounted on the main panel to form a space 29 (FIGS. 3 and 5) therebetween. The front panel 26 is attached to spacer members 27 and 28 by screws 30, and, when the screws 30 are removed, the front panel can be removed. A circular disc or wheel 31 is mounted on the pivot bolt 23 to swing or turn about the axis thereof. The wheel 31 can be formed of translucent plastic material. The wheel 31 is of greater diameter than the semi-circular portion 22 of the main panel 21 and extends outboard thereof. A pointer member 32 is attached to the outwardly extending portion of the wheel member 31 as indicated most clearly at FIGS. 4 and 6. An indicating arm portion 33 of the pointer member 32 extends inwardly overlying an outer edge of the semi-circular portion 22 of the main panel 21 to indicate the angular displacement of the wheel 31. A pivot pin 36 is mounted in the pointer member 32 and extends forwardly and substantially horizontally therefrom substantially in alignment with the edge of the semi-circular portion 22 of the main panel 21. A radius indicating arm 37 links the pivot bolt 23 and the pivot pin 36. A pendulum member 38 is mounted on the pivot pin 36, as indicated most clearly in FIGS. 1 and 6, and extend downwardly with a plumb bob 39 at the lower end thereof being received in the space 29 as indicated in FIGS. 1 and 5. The body portion of the pendulum is provided with graduations 41 (FIG. 1). The graduations on the pendulum are related to the effective length of the radius indicating arm 37, and the spacing of graduations can be $\frac{1}{10}$ and $\frac{1}{100}$ of the length of the arm 37. A horizontal diameter through the pivot bolt 23 is indicated at 42 (FIG. 1), and the sin function can be read and visually observed on the pendulum arm at the point where the arm of the pendulum member 38 crosses the horizontal diameter 42. Substantially immediately below the horizontal diameter is located an upper edge 43 of the front panel 26 so that substantially only that portion of the arm of the pendulum is exposed which represents the sin function. Similarly the value of the cosin function can be read and visually observed on similarly spaced graduations on the horizontal diameter at the point on the horizontal diameter where the arm of the pendulum member 38 crosses it.

As indicated in FIGS. 1 and 5, the front panel 26 is provided with a window 46. As shown in FIG. 5, the main panel 21 is provided with a window 47 aligned with the window 46. Through the windows 46 and 47, a portion of a front face 48 of the wheel 31 can be observed, as indicated in FIG. 1. On this face of the wheel 31 are inscribed indicia 49, which indicate numerical values of the various functions for the angle at which the pointer member 32 is positioned. Only the indicia for a single angle are shown in the drawings in FIG. 1, but it is to be understood that for each of selected angles to which the wheel can be turned, appropriate indicia are presented for observation through the windows 46 and 47. The device can be illuminated from the rear by an appropriate light source 48, and the illuminated functions can be seen through the windows 46 and 47. In addition, the outer edge of the wheel 31 outboard of the semicircular portion 22 is illuminated to form a semicircular halo of light. The semicircular portion 22 can be formed of opaque material to contrast with this halo.

In FIGS. 7 to 13, inclusive, is illustrated a teaching aid constructed in accordance with another embodiment of my invention. This teaching aid includes a body 51 (FIGS. 7 and 8), a wheel 52, a radius arm 53 (FIG. 7), a pendulum member 54 and a pointer member 55.

Figure 9:
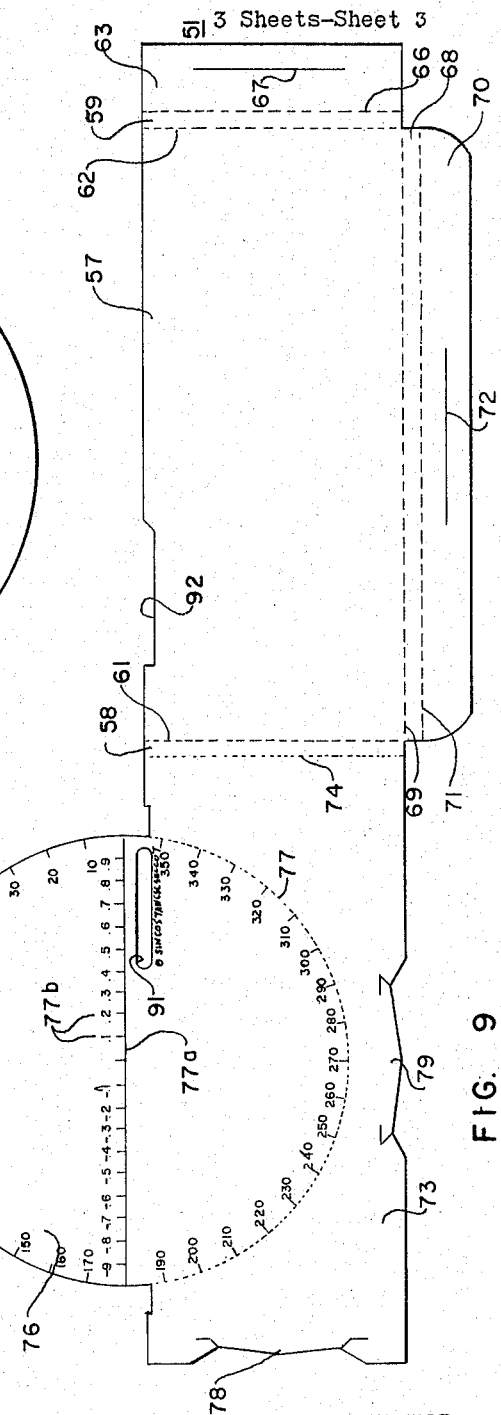
FIG. 9 is a plan view of a blank from which a body of the device shown in FIGS. 7 and 8 is constructed, score lines being indicated in dashed lines, rows of perforations being indicated in dotted lines.

The body 51 is formed from a paperboard blank, the construction of which is shown in FIG. 9. The body 51 includes a front panel 57 and end panels 58 and 59 hinged to the front panel 57 at score lines 61 and 62 respectively. An end flap 63 is hinged to the end panel 59 at a score line 66. An upright line of cut in the end flap 63 is indicated at 67. A bottom panel 68 is hinged to the front panel 57 along a score line 69. A bottom flap 70 is hinged to the bottom panel 68 along a score line 71. A lengthwise line of cut in the bottom flap 70 is indicated at 72. A main or rear panel 73 is hinged to the end panel 58 along a line of perforations 74. The rear panel includes a circular portion 76 separated from the remainder thereof by a line of perforations 77. On the circular portion 76, a horizontal diameter 77a is indicated which is provided with indicia 77b subdividing the horizontal diameter. Angular displacement from the horizontal diameter 77a around the center of the circular portion 76 is indicated by indicia 77c. Tab portions 78 and 79 of the rear panel 73 are constructed to be received in the slots 67 and 72 respectively, to assemble the body 51 with the front and rear panels parallel to and spaced from each other, as indicated in FIG. 13, to provide a space 81 therebetween into which the lower end portion of the pendulum member 54 extends, as shown in FIG. 7.

The wheel 52 (FIG. 10) can likewise be formed of paperboard or the like or can be formed of plastic sheet material and is of circular shape. The pointer member 55, as shown most clearly in FIG. 12, can include a base section 83 and a pointer section 84, which are attached to the wheel 52 by rivets 86 as indicated in FIGS. 10 and 12. A pivot pin 85 is mounted in and extends outwardly from the pointer section 84 perpendicular to and substantially in alignment with the outer edge of the circular portion 76 of the main panel 73. The wheel 52, radius arm 53 and body 51 are assembled as indicated in FIG. 13, with a rivet 87 holding these members in assembled relation so that the wheel 52 and radius arm 53 can swing or pivot around the center of the circular portion 76.

The wheel 52 is provided with indicia 89 as shown in FIG. 10 indicating the trigonometric functions for various angles. In the drawing, only certain of the indicia are shown, but it is to be understood that indicia for other angles are arranged around the face of the wheel 52. As shown in FIG. 9, a slot 91 is provided in the circular portion 76 of the main panel 73. The indicia 89 can be read through the slot 91, as indicated most clearly in FIG. 7, the indicia appearing in the slot being those for the angle at which the pointer 55 is disposed. A cut away portion 92 in the front panel 57 reveals the indicia.

When the device of FIGS. 7 and 8 is assembled in the condition shown therein, it operates in substantially the same manner as the device of FIGS. 1-6, inclusive. The pendulum member 54 hangs in upright position from the pivot pin 85, and values for the sin function can be read at the position where the pendulum member 54 crosses the horizontal diameter 77a, substantially all the lower portion of the pendulum member 54 below the horizontal diameter being hidden inside the space 81. The value for the cosin function similarly can be read on the horizontal diameter at the position at which the pendulum member 54 crosses same. More precise values of the functions can be determined by reference to the indicia revealed in the slot 91.

Figure 11:
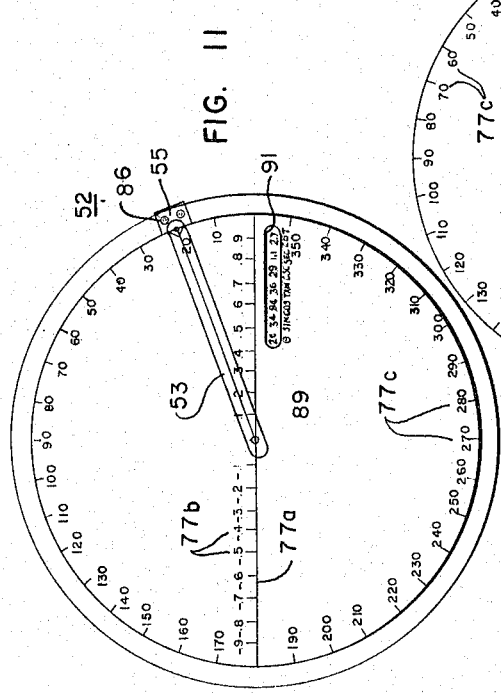
FIG. 11 is a view in front elevation of the device illustrated in FIGS. 7 and 8 after removal of a box portion thereof.

When a student has become accustomed to use of the device and has become familiar with the trigonometric functions, the pendulum member 54 can be removed and the box forming portion of the body can be removed by separating the body from the circular portion 76 along the line of perforations 77 to put the device in the form shown in FIG. 11. In this form, the teaching aid becomes a calculator by means of which values of the trigonometric function can readily be determined by swinging the pointer 55 to a desired angle whereupon the values of the functions are read through the slot 91.

The teaching aids shown in the drawings and described above are subject to structural modification without departing from the spirit and scope of the following claims.

Having described my invention, what I claim as new and desired to secure by Letters Patent is:

1. A teaching aid which comprises an open topped box, an upstanding wall extending upwardly from a rear wall of said box, there being angle indicating indicia on said upstanding portion, a front wall of said box terminating adjacent a horizontal diameter through the center of said angle-indicating indicia, a wheel mounted on the upstanding portion and swingable around said center, a pivot pin mounted on the wheel adjacent the angle indicating indicia, and a pendulum member mounted on said pivot pin and extending downwardly therefrom into the space between front and rear walls of the box, there being function indicating indicia on the horizontal diameter and the pendulum member for indicating the values of trigonometric functions.

2. A teaching aid in accordance with claim 1 characterized by the fact that the upstanding portion is substantially semi-circular in form, that the diameter of the wheel is greater than that of the semi-circular upstanding portion and that the pivot pin is mounted on the wheel adjacent the outer edge of the semi-circular upstanding portion.

3. A teaching aid which comprises an open topped box, an upstanding wall extending upwardly from a rear wall of said box, there being angle-indicating indicia on said upstanding portion, a front wall of said box terminating adjacent a horizontal diameter through the center of said angle-indicating indicia, a wheel mounted on the upstanding portion and swingable around said center, a substantially horizontal pivot pin mounted on the wheel adjacent the angle indicating indicia, and a pendulum member mounted on said pivot pin and extending downwardly therefrom into the space between front and rear walls of the box, there being function indicating indicia on the horizontal diameter and the pendulum member for indicating the values of trigonometric functions, there being function indicating indicia on the wheel, there being a window in the box revealing a selected portion of the indicia.

4. A teaching aid which comprises an open topped box, an upstanding semi-circular wall extending upwardly from and integral with a rear wall of said box, there being angle-indicating indicia on said upstanding portion, a front wall of said box terminating adjacent a horizontal diameter through the center of said angle-indicating indicia, a wheel mounted on the upstanding portion and swingable around said center, a pin mounted on the wheel adjacent the angle indicating indicia, and a pendulum member mounted on said pivot pin and extending downwardly therefrom into the space between front and rear walls of the box, there being function indicating indicia on the horizontal diameter and the pendulum member for indicating the values of trigonometric functions, there being function indicating indicia on the wheel, there being a window in the rear wall revealing a selected portion of the indicia, the front wall and pendulum being removable.

5. A teaching aid which comprises an open topped box, an upstanding semi-circular wall extending upwardly from and integral with a rear wall of said box, there being angle-indicating indicia on said upstanding portion, a front wall of said box terminating adjacent a horizontal diameter through the center of said angle-indicating indicia, a wheel mounted on the upstanding portion and swingable around said center, a pin mounted on the wheel adjacent the angle indicating indicia, and a pendulum member mounted on said pivot pin and extending downwardly therefrom into the space between front and rear walls of the box, there being function indicating indicia on the horizontal diameter and the pendulum member for indicating the values of trigonometric functions, there being function indicating indicia on the wheel, there being a window in the rear wall revealing a selected portion of the indicia, the front wall and pendulum being removable, a lower portion of the rear wall being removable to render the semi-circular wall and the remaining portion of the rear wall substantially circular, the pin being swingable around said circular wall.

6. A teaching aid which comprises a one-piece paperboard body including a rear panel, there being a substantially half-circular row of perforations in said rear panel terminating at an edge thereof and dividing the rear panel into an outer section and an inner section, the inner section being of circular shape and including an upstanding portion extending upwardly from said edge, there being angle indicia on said circular section arranged around the center and adjacent the edge thereof, an end panel hinged to an edge of the outer section of the rear panel, a front panel hinged to the end panel, means on the front and rear panels remote from the end panel for linking the front and rear panels in parallel spaced relation to form an open-topped box with the front panel terminating adjacent a horizontal diameter through the center of the rear panel, a wheel mounted on the circular section and swingable about the center thereof, a pivot pin mounted on the wheel adjacent the angle indicating indicia, and a pendulum member mounted on said pivot pin and extending downwardly therefrom into the space between front and rear walls of the box, there being function indicating indicia on the horizontal diameter and the pendulum member for indicating the values of trigonometric functions, there being function indicating indicia on the wheel, there being a window in the rear wall revealing a selected portion of the indicia, the front wall and pendulum being removable, the outer section of the rear wall being removable at the row of perforations so that the pivot pin is swingable around the circular section.

7. A teaching aid which comprises an open topped box, an upstanding opaque semi-circular wall extending upwardly from a rear wall of said box, there being angle-indicating indicia on said upstanding portion, a front wall of said box terminating adjacent a horizontal diameter through the center of said angle-indicating indicia, a translucent wheel mounted on and behind the upstanding portion and swingable around said center, a substantially horizontal pivot pin mounted on the wheel adjacent the angle-indicating indicia, and a pendulum member mounted on said pivot pin and extending downwardly therefrom into the space between front and rear walls of the box, there being function indicating indicia on the horizontal diameter and the pendulum member for indicating the values of trigonometric functions, there being function indicating indicia on the wheel, there being a window in the box revealing a selected portion of the indicia, an edge portion of the wheel being exposed outboard of the semi-circular wall, said edge portion and the indicia in the wheel being illuminatable from behind.

References Cited by the Examiner
UNITED STATES PATENTS

| | | |
|---|---|---|
| 1,536,693 | 5/1925 | Schneider. |
| 1,955,392 | 4/1934 | Shimberg. |

FOREIGN PATENTS

| | | |
|---|---|---|
| 169,495 | 9/1921 | Great Britain. |

EUGENE R. CAPOZIO, *Primary Examiner.*

W. GRIER, *Assistant Examiner.*